(12) United States Patent
Westerink et al.

(10) Patent No.: US 7,216,288 B2
(45) Date of Patent: May 8, 2007

(54) DYNAMIC SCENE DESCRIPTION EMULATION FOR PLAYBACK OF AUDIO/VISUAL STREAMS ON A SCENE DESCRIPTION BASED PLAYBACK SYSTEM

(75) Inventors: Peter Hans Westerink, Ossining, NY (US); Stephen Peter Wood, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 09/892,802

(22) Filed: Jun. 27, 2001

(65) Prior Publication Data

US 2003/0016747 A1 Jan. 23, 2003

(51) Int. Cl.
*G06F 17/00* (2006.01)

(52) U.S. Cl. .................. 715/500.1; 715/513; 348/473; 370/535

(58) Field of Classification Search ............. 715/500.1, 715/513; 709/247, 231; 348/473, 699; 382/260, 382/236; 386/126; 370/535
See application file for complete search history.

(56) References Cited

U.S. PATENT DOCUMENTS

| | | | | |
|---|---|---|---|---|
| 5,642,171 A * | 6/1997 | Baumgartner et al. | ...... | 348/515 |
| 5,650,829 A | 7/1997 | Sugimoto et al. | ........... | 349/699 |
| 5,659,539 A | 8/1997 | Porter et al. | ................. | 709/231 |
| 5,684,715 A | 11/1997 | Palmer | ........................ | 348/473 |
| 5,694,334 A | 12/1997 | Donahue et al. | ........... | 709/247 |
| 5,754,783 A * | 5/1998 | Mendelson et al. | ......... | 709/217 |
| 5,822,537 A * | 10/1998 | Katseff et al. | .............. | 709/231 |
| 5,950,202 A * | 9/1999 | Durward et al. | .............. | 707/10 |
| 5,999,944 A * | 12/1999 | Lipkin | ..................... | 707/104.1 |
| 6,023,270 A * | 2/2000 | Brush et al. | ................. | 715/741 |
| 6,032,156 A | 2/2000 | Marcus | ..................... | 707/104.1 |
| 6,044,397 A * | 3/2000 | Eleftheriadis et al. | ...... | 725/139 |
| 6,075,901 A | 6/2000 | Signes et al. | ............... | 382/260 |
| 6,157,745 A | 12/2000 | Salembler | .................... | 382/236 |
| 6,189,045 B1 * | 2/2001 | O'Shea et al. | .............. | 709/246 |
| 6,243,856 B1 * | 6/2001 | Meyer et al. | ................ | 717/146 |
| 6,314,234 B1 * | 11/2001 | Kawamura et al. | ........... | 386/95 |
| 6,388,680 B1 * | 5/2002 | Bayrakeri | .................... | 715/744 |
| 6,407,680 B1 * | 6/2002 | Lai et al. | ....................... | 341/50 |
| 6,445,740 B1 * | 9/2002 | Mallart et al. | ......... | 375/240.08 |
| 6,490,370 B1 * | 12/2002 | Krasinski et al. | ........... | 382/195 |
| 6,539,166 B2 * | 3/2003 | Kawamura et al. | ........... | 386/95 |
| 6,557,041 B2 * | 4/2003 | Mallart | ....................... | 709/231 |
| 6,567,427 B1 * | 5/2003 | Suzuki et al. | ............... | 370/535 |

(Continued)

OTHER PUBLICATIONS unknown, "MPEG4IP Feature List", date unknown, downloaded from http://mpeg4ip.sourceforge.net/features/index.php.*

(Continued)

*Primary Examiner*—Heather R. Herndon
*Assistant Examiner*—J H Blackwell
(74) *Attorney, Agent, or Firm*—Douglas W. Cameron; Anne Dougherty

(57) ABSTRACT

A method, and program storage device apparatus for adapting multi-media presentations of various formats to a new format suitable for playback on a general scene description based playback system. More specifically, when mult-media presentations do not contain scene description components, such components appropriate to the multi-media presentation will be constructed. The multi-media presentation will then be presented together with the created scene description components to the playback system for decoding rendering.

15 Claims, 3 Drawing Sheets

U.S. PATENT DOCUMENTS

| | | | |
|---|---|---|---|
| 6,580,756 B1* | 6/2003 | Matsui et al. | 375/240.08 |
| 6,621,939 B1* | 9/2003 | Negishi et al. | 382/291 |
| 6,631,403 B1* | 10/2003 | Deutsch et al. | 709/217 |
| 6,654,931 B1* | 11/2003 | Haskell et al. | 715/500.1 |
| 6,693,645 B2* | 2/2004 | Bourges-Sevenier | 345/619 |
| 6,697,869 B1* | 2/2004 | Mallart et al. | 709/231 |
| 6,751,623 B1* | 6/2004 | Basso et al. | 707/101 |
| 6,751,655 B1* | 6/2004 | Deutsch et al. | 709/219 |
| 6,883,141 B2* | 4/2005 | Negishi et al. | 715/734 |
| 6,898,320 B2* | 5/2005 | Han et al. | 382/232 |
| 6,931,541 B1* | 8/2005 | Nakagawa | 713/193 |
| 6,934,906 B1* | 8/2005 | Cheok | 715/500.1 |
| 6,968,006 B1* | 11/2005 | Puri et al. | 375/240.08 |
| 2001/0000962 A1* | 5/2001 | Rajan | 345/302 |
| 2001/0018769 A1* | 8/2001 | Matsui | 725/87 |
| 2001/0027468 A1* | 10/2001 | Okura | 709/202 |
| 2001/0050924 A1* | 12/2001 | Hermann et al. | 370/493 |
| 2001/0055341 A1* | 12/2001 | Herrmann et al. | 375/240.25 |
| 2001/0055476 A1* | 12/2001 | Takahashi et al. | 386/98 |
| 2001/0056471 A1* | 12/2001 | Negishi et al. | 709/208 |
| 2002/0036639 A1* | 3/2002 | Bourges-Sevenier | 345/474 |
| 2002/0047899 A1* | 4/2002 | Son et al. | 348/114 |
| 2002/0089508 A1* | 7/2002 | Sowizral et al. | 345/522 |
| 2002/0129373 A1* | 9/2002 | Noda et al. | 725/90 |
| 2003/0031260 A1* | 2/2003 | Tabatabai et al. | 375/240.25 |
| 2004/0024898 A1* | 2/2004 | Wan | 709/231 |
| 2004/0107356 A1* | 6/2004 | Shamoon et al. | 713/193 |
| 2004/0111676 A1* | 6/2004 | Jang et al. | 715/513 |
| 2005/0132264 A1* | 6/2005 | Joshi et al. | 715/500.1 |

OTHER PUBLICATIONS unknown,"MPEG4IP Guide", date unknown, downloaded from http://mpeg4ip.sourceforge.net/documentation/MPEGIP_Guide.pdf.*

Kim et al., "Extensible MPEG-4 Textual Format (XMT)", 2000 ACM.* unknown, "Multimedia Format for the Linguistic Data", unknown date, downloaded from emeld.org/school/readingroom/Multimedia_Format.doc.*

Bouilhaguet et al, "Adding Delivery support to MPEG-Pro, an Authoring System for MPEG-4", date unknown, ENST Paris.*

Dixon, "Video Format Conversion: AVI and QuickTime and MPEG", Aug. 1999, downloaded from http://www.mainfest-tech.com/media_pc/vid_fmt_cvt.htm.*

Dufourd, "MPEG-4 XMT <> SMIL/SVG", Feb. 13, 2003, powerpoint presentation.*

Kim et al., "Design and Implementation of MPEG-4 Authoring Tool", date unknown, ETRI.*

Lehane et al., "MPEG-4 Tools and Applications: An Overview", Dublin City Univ., date unknown.*

Eleftheriadis et al, "MPEG-4 Systems", Columbia Univ, Flavor Software, date unknown.*

[1] H. Schulzrinne, S. Casner, R. Frederick and V. Jacobson, "RTP: A Transport Protocol for Real-TIme Applications." RFC 1889, Jan. 1996.

[2] Schulzrinne, A. Rao, and R. Lanphier, "Real Time Streaming Protocol (RTPS)", RFC 2326, Apr. 1998.

[3] ISO/IEC JTC1/SC 29/WG11 N3850, ISO/IEC 14496-1:2000(E), "Information Technology—Coding of audio-Visual Objects—Part 1: Systems".

[4] ISO/IEC 14772-111998, Information Technology—Computer Graphics and Image Processing—The Virtual Reality Modeling Language-Part 1: Functional Specification and UTF-8 Encoding.

* cited by examiner

DYNAMIC SCENE DESCRIPTION EMULATION FOR PLAYBACK OF AUDIO/VISUAL STREAMS ON A SCENE DESCRIPTION BASED PLAYBACK SYSTEM

TECHNICAL FIELD

The present invention relates to the field of multi-media playback, and, more particularly, to a system and technique for playback of multi-media presentations with various formats on an playback system that requires scene description information.

DESCRIPTION OF THE PRIOR ART

Scene Description Components in Case of MPEG-4

MPEG-4 (Motion Picture Experts Group) is a recent standard from the International Organization for Standardization (ISO) for the coding of natural and synthetic audio-visual data in the form of audio-visual objects that are arranged into an audio-visual scene by means of a scene description. Just like the predecessor standards MPEG-1 and MPEG-2, MPEG-4 also describes the coding of audio and video data. In addition, MPEG-4 defines new types of elementary streams that describe where and when the audio-visual information is to be placed in a scene. Further, these new elementary streams in MPEG-4 allow user interaction with the objects in the scene. This notion of a scene containing multiple audio-visual objects that can be interacted with is new in MPEG-4.

Whereas "Systems" in MPEG-1 and MPEG-2 meant the specification of the multiplexing of 2 or more audio/visual streams, in MPEG-4 the "Systems" specification describes certain elementary streams that enable many of the newly introduced features of MPEG-4 [3]. More specifically, two new types of elementary streams are introduced: a Scene Description (SD) stream and an Object Descriptor (OD) stream.

The MPEG-4 Scene Description, also called "BInary Format for Scenes" (BIFS), is based upon the Virtual Reality Markup (VRML) 2.0 standard [4]. As such, MPEG-4 scene description is presented as a graph comprised of many different scene graph nodes. However, MPEG-4 extends VRML in various ways, most notably by adding many specific 2D nodes, defining a way to efficiently compress the data, and by adding commands to update the scene. The MPEG-4 Scene Description stream (SD stream) is therefore comprised of a series of commands, such as to replace the entire scene, or to insert or delete nodes.

The MPEG-4 Object Descriptor (OD) stream constitutes a framework for conveying information about the various objects in the scene that are associated to other elementary streams, such as a video stream or an audio stream. An important notion is that each elementary stream is identified with its own Object Descriptor, which carries information so that the elementary stream can be associated with the appropriate node in the scene. Just as with the SD stream, the OD stream consists of commands such as to add or remove descriptors. Note that reception of a new Object Descriptor typically announces the imminent arrival and start of a new elementary stream and that, therefore, measures need to be taken by the receiver to be ready (such as to open the data channel and to setup buffers).

Finally, the Scene Description and Object Descriptor streams are themselves also described by an Object Descriptor. This "Initial Object Descriptor" is to be delivered to the receiver by out of band means, and reception thereof effectively initiates an MPEG-4 "session".

Exemplary MPEG-4 Playback System Architecture Description

A block diagram of a typical MPEG-4 playback system architecture is shown in FIG. 1. The data is generally received at a network layer 101, which takes care of the network specific formatting. Note that this may include reading from a local file, while examples of other implementations may realize the Real Time Protocol/Real Time Streaming Protocol RTP/RTSP as defined for MPEG-4 or the MPEG-2 transport stream. The data is next passed into a Synchronization Layer 102, where each media stream is put into a buffer 105. The Scene Description (SD) stream and Object Descriptor (OD) streams that enter through a Sync Layer buffer are decoded by their corresponding stream decoders 106 and 107 as part of what is called the "MPEG-4 Systems Object decoder" 103. The SD stream holds commands that affect the scene, such as insert-node or replace-scene, and are passed on for execution to the compositor block 104, that manages the scene. The OD stream contains messages pertaining to objects that require their own elementary streams. Examples are elementary stream, audio, and still images. Reception of a new "Object Descriptor" on the OD stream will result in the construction of a new object decoder, which includes setting up the object elementary stream decoder, a Sync Layer buffer, and making the connection to a channel in the Network layer that will receive the data. Note that an object may use multiple stream decoders such as is the case with, for example, scalable elementary streams. The outputs of the various object decoders are attached to a corresponding (associated) node in the MPEG-4 scene, where the decoded data is rendered as part of the scene. For example, the output of a Elementary stream decoder 110 is connected to a MovieTexture node 108, while the output of an Audio decoder 111 is connect to an AudioSource node 109.

Playback Initiation when Using MPEG-4 Systems

To illustrate the function and the workings of MPEG-4 Systems in a typical MPEG-4 playback system, the following is a walk through of an MPEG-4 playback system session set up.

1. The MPEG-4 playback system is given the URL for a particular MPEG-4 presentation. The session is initiated by passing this URL string to the MPEG-4 playback system.
2. The MPEG-4 playback system takes the URL string and passes it on to the player network front end. Based upon the URL protocol, which can for example be "file://" or "rtsp://", the network component creates the appropriate handler that will take care of the protocol and network specific format.
3. The MPEG-4 playback system will then ask for the Initial Object Descriptor (IOD) from the protocol handler just created. If this were for example for RTSP, the handler would request the IOD via an RTSP "DESCRIBE" method, and in the case of a local MPEG-4 file, the file handler will locate the IOD in the file and return it.
4. The MPEG-4 playback system parses the IOD to obtain information about the Scene Description and Object Descriptor streams. For each of the described streams, the player will open the appropriate data channel through the network layer. Again, the type of channel and how it is opened will depend on the particular network protocol.
5. The MPEG-4 playback system is now ready to receive the data of the SD and OD streams. Depending on the particular situation, the player will explicitly ask for the sending of data to be started such as in the case with unicast RTP or a local file. Alternatively, the data may already have started flowing in at the moment that the data channels were opened, such as in the case of multicast RTP or broadcast over an MPEG-2 Transport Stream.

6. When a new Object Descriptor arrives on the OD stream, a new elementary stream is announced. Just as with accessing the data of the SD and OD streams, which was announced by the Initial Object Descriptor, the player opens the appropriate channel through the network layer. Other necessary resources such as buffers and the appropriate decoder are also created. These resources are freed and channels are closed when messages for removal of Object Descriptors are received on the OD stream.

Playback in Absence of MPEG-4 Systems Components

Most of the currently existing multimedia presentations consist of just a video and/or an audio elementary stream. In such cases it is implicitly known what the scene composition is, and there is no user interaction. Therefore, to display such a basic presentation it is not necessary to have MPEG-4 Systems. Indeed, many presentations comprise of just the elementary streams for video and audio and do not have the typical MPEG-4 Systems components of SD and OD streams and the Initial Object Descriptor.

However, as illustrated above, a typical MPEG-4 playback system relies on the specified mechanisms for MPEG-4 Systems components to start and maintain a presentation. So in order to be able to play simple presentations that do not use the MPEG-4 Systems components (SD and OD streams and Initial Object Descriptor), it is necessary to modify and/or adapt an MPEG-4 Systems based player.

It is possible to use the same decoder components in a customized player that does not use MPEG-4 Systems. In fact, many "media players" do just that. They are shells that construct and direct the flow of data from input through the appropriate decoders to the customized rendering engine. In basic presentations the rendering is typically constrained to audio and the display of a single elementary stream or still image. In such customized players the decoders and rendering engines are switched and connected according to the type of incoming data. Note that this data could be a full MPEG-4 presentation, including MPEG-4 Systems, which for one requires a highly specialized rendering engine.

SMIL

Another standard for playback of multimedia presentations is the Synchronized Multimedia Integration Language (SMIL) [5]. In the case of SMIL the scene description consists of a text document. Just as with MPEG-4, without the proper adaptation it is not possible to play an audiovisual presentation that consists solely of an audio and video component, but does not have a SMIL specific scene description document

REFERENCES:

[1] H. Schulzrinne, S. Casner, R. Frederick, and V. Jacobson, "RTP: A transport protocol for real-time applications." RFC 1889, January 1996.
[2] H. Schulzrinne, A. Rao, and R. Lanphier, "Real Time Streaming Protocol (RTSP)", RFC 2326, April 1998.
[3] ISO/IEC JTC1/SC 29/WG11 N3850, ISO/IEC 14496-1: 2000(E), "Information technology—Coding of audio-visual objects—Part 1: Systems".
[4] ISO/IEC 14772-1: The Visual Reality Modeling Language (VRML), 1997, http://www.web3d.org/technicalinfo/specifications/vrml97/index.htm
[5] Synchronizezed Multimedia Integration Language (SMIL), http://www.w3.org/AudioVideo/.

SUMMARY OF THE INVENTION

Instead of switching entire player engines, it is an object of the present invention to use an MPEG-4 playback system that requires MPEG-4 Systems, and to simulate the MPEG-4 System components in the network front end. For example, for a presentation with just a video and an audio elementary stream, simulation means that an encoded "scene replacement" command is created, containing a scene graph with the necessary nodes for rendering the video and audio elementary streams. Also included in this simulation is the creation of the appropriate "Object Descriptor update" messages for the video and audio elementary streams are constructed and encoded to construct the OD stream. Finally, an Initial Object Descriptor is constructed that describes the two artificial OD and SD streams.

So in absence of the MPEG-4 Systems elements, these elements can be seen to be simulated in the network layer and fed into the MPEG-4 playback system together with the existing presentation streams. The MPEG-4 playback system is not aware that the presentation originally does not have the MPEG-4 System elements and can play the presentation as intended. Note that those skilled in the art can simulate more than just the minimally required Systems components for a basic audio/visual presentation. For example, an automated annotation system can add text to the presentation, which otherwise would have to be overlaid and edited into the elementary stream frames.

The present invention adapts multi-media presentations of various formats to a format that makes the new format suitable for playback on a general scene description based playback system. Examples of such systems are an MPEG-4 playback system that requires MPEG-4 System components and a SMIL playback system that requires a SMIL document. Both a system and method are provided. In accordance with the method, when multi-media presentations do not contain scene description components, these components will be constructed appropriate to the multi-media presentation. The multi-media presentation will then be presented together with the created scene description components to the playback system for decoding and rendering.

DETAILED DESCRIPTION OF THE INVENTION

Figure 1:
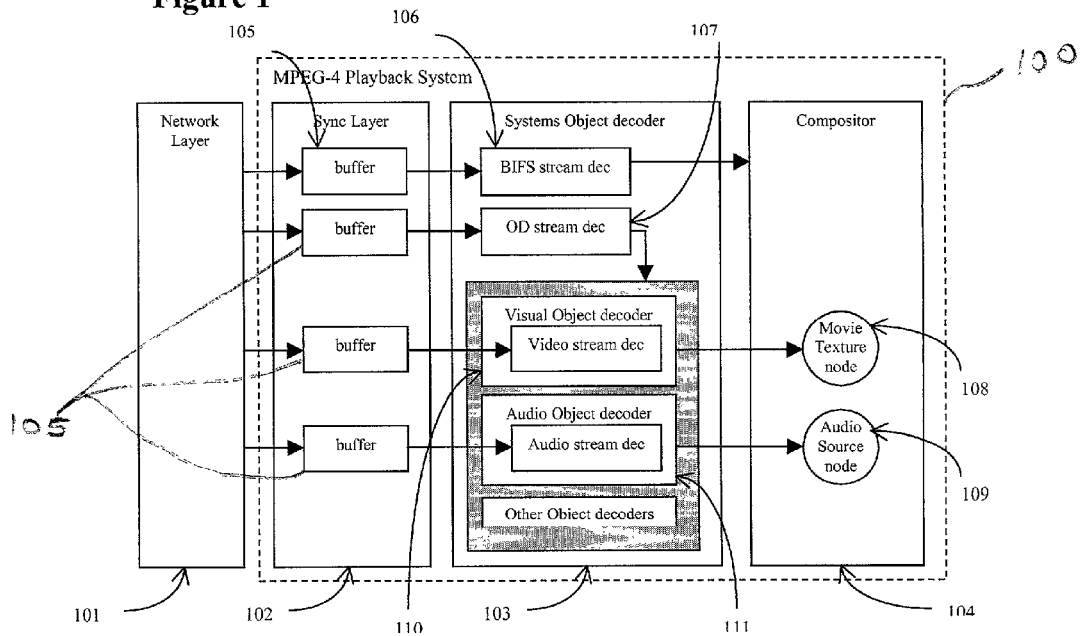
FIG. 1 shows a system overview of an exemplary MPEG-4 playback system.
Figure 2:
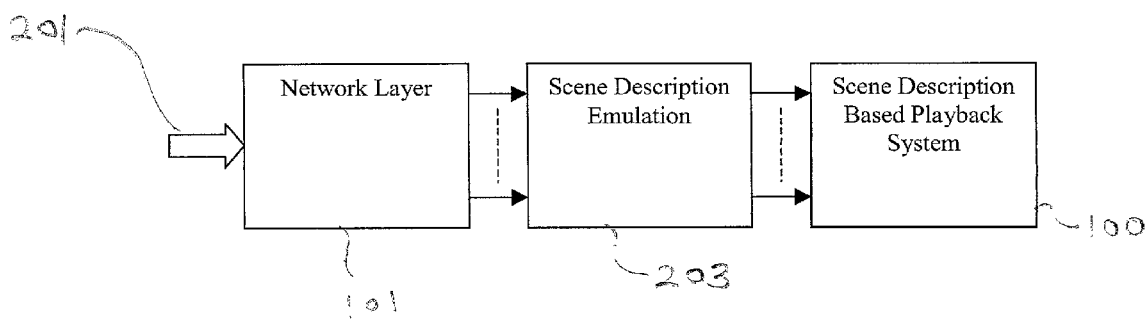
FIG. 2 shows the overall system with a scene description based playback system plus an exemplary placement of the scene description emulation block.

A simplified exemplary block diagram of such a system is depicted in FIG. 2. An input multi-media presentation 201 is presented to the new augmented playback system. This consists first of a network layer 101, that will accept the data from the network and extract the separate multimedia elementary streams. These elementary streams are next fed into the MPEG-4 Systems emulation block 203, resulting in another set of elementary streams. These streams are next presented to the typical MPEG-4 playback part 100, being one that requires MPEG-4 Systems. The simulation block 203 will first determine if MPEG-4 systems simulation is necessary or not. If the presented multimedia data streams do not contain MPEG-4 systems streams, block 203 will generate the missing streams, so that the now augmented set of streams can be handled by the typical MPEG-4 playback system 101. If the input multi-media data 201 already contains the MPEG-4 Systems components, the simulation block will not generate anything and will merely pass on the streams as is. The implementation of the scene description unit emulation unit 203 could be implemented by programming an ordinary computer in accordance with the exemplary algorithm of FIG. 4. Those skilled in the art could implement unit 203 in any fashion befitting the environment, including hardware devices such as specialized integrated circuits, programmable chips, or combinations thereof. Note that the location of the emulation unit 203 does not have to be as in the exemplary MPEG-4 client implementation as shown in FIG. 2. Those skilled in the art could just as well choose to implement such an emulation unit 203 somewhere in the network or on a server, thus realizing a transcoder that translates presentations with for example just a video and an audio elementary stream into the equivalent MPEG-4 presentation that includes MPEG-4 Systems components.

Generation of MPEG-4 Systems Components

Figure 5:
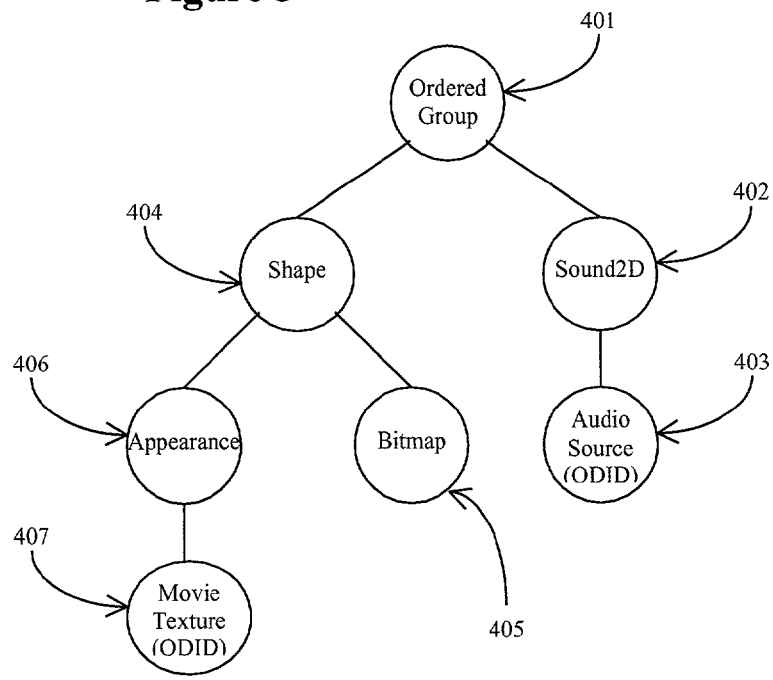
FIG. 5 shows an exemplary scene graph composition for the case when the multi-media presentation consists of a video and an audio elementary stream.
Figure 3:
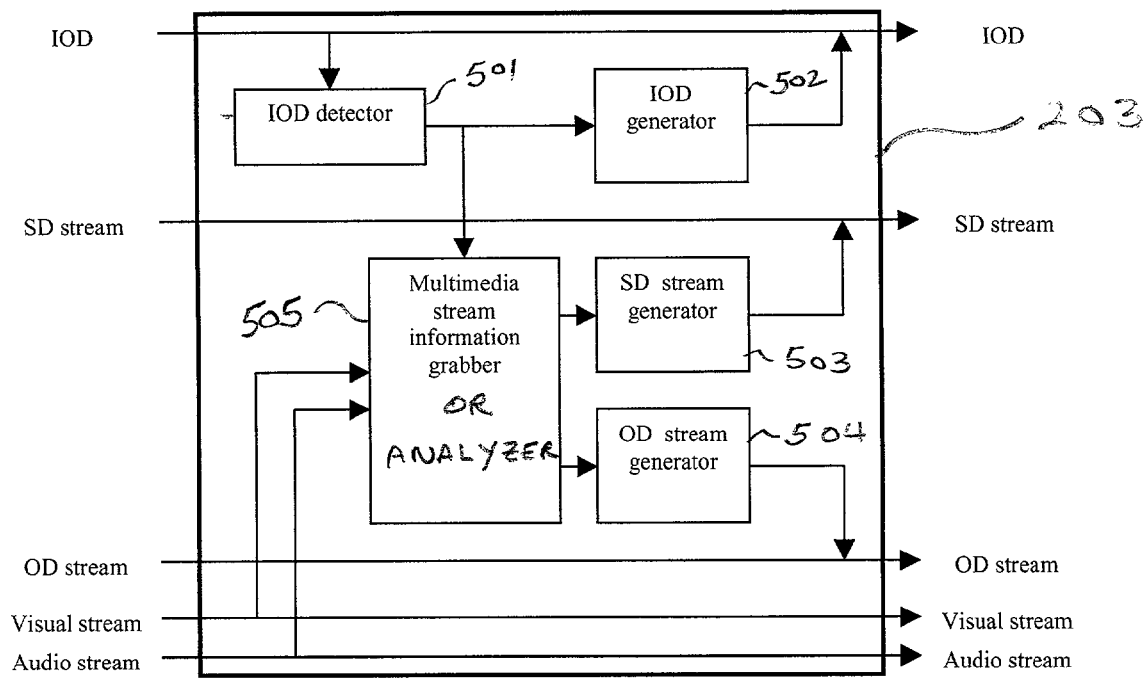
FIG. 3 shows an exemplary scene description emulation block.
Figure 4:
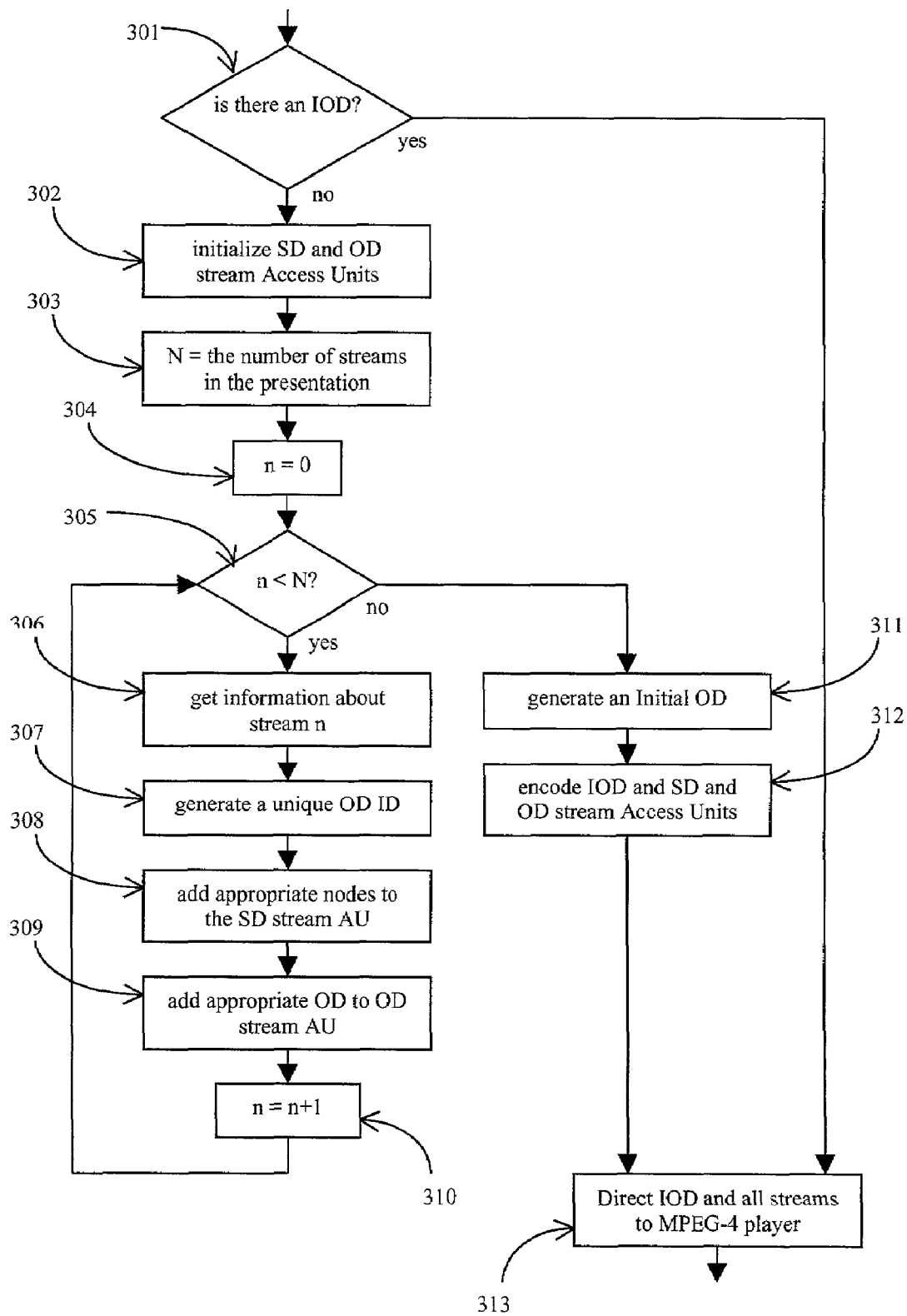
FIG. 4 shows an exemplary flow diagram of the emulation system that constructs the necessary MPEG-4 Systems components in accordance with the multi-media presentation.

To realize and implement the creation of the MPEG-4 Systems components several steps have to be taken. FIG. 5 shows an exemplary block diagram. First in 501 it is detected whether the MPEG-4 Systems streams are present or not. This is done in the exemplary embodiment by checking for the presence of the MPEG-4 Initial Object Descriptor, but it is, for example, equally possible to do this by checking the presence of the Scene Description and/or Object Descriptor streams. The detection result is signaled to the IOD generator 502, the SD generator 503, and the OD stream generator 504. An exemplary implementation of components 502, 503, and 504 will be described below in the description of FIG. 4. If the MPEG-4 System components are detected, then the three generators 502, 503, and 504 will not generate any output, which in essence results in a pass-through of the input IOD, SD stream and OD stream to the output, without alteration. If, on the other hand, the MPEG-4 Systems components are not detected, then the three generators, 502, 503, and 504, will generate their respective components and pass the results on to the output. The analyzer 505 will extract the necessary information from the input audio and visual stream, that is used by the SD and OD stream generators 503 and 504. An example of such information consists of the so-called "Decoder Specific Information", which is typically several bytes that may be different for each type and instance of stream. Contained within that information could be profile and level information, a bit rate, a size, etc. In component 505 the required information can be extracted from the input streams using, for example, existing parsers that are well known to those skilled in the art. The input audio and visual streams will always pass through the MPEG-4 Systems Emulation block unaltered. Note that those skilled in the art would know how to apply the same principles as set forth to presentations that for example may have more than one video stream (such as may be the case for multi-party video-conferencing). FIG. 4 shows a block diagram of an exemplary algorithm. First, in 301 it is checked if the multi-media presentation contains MPEG-4 Systems or not. If not, 302 initializes the MPEG-4 Systems components. For the MPEG-4 SD stream this means that a new Scene Replacement command is created, which is a message to the MPEG-4 player to remove an existing old scene, if present, and to construct a new scene as described in the Scene Replacement command. The new scene created by 302 contains only a root node, which is the top of the scene graph tree onto which "child" nodes can be attached. At this point this root node does not yet have any children. For the OD stream an as of yet empty update OD stream message is created. The number of streams in the multi-media presentation is determined in 303. This value is typically 1 (for example in cases of only audio, only elementary stream, or only a still image) or 2 (for example in cases of audio plus elementary stream, or a stream of still images plus audio). The stream counter is initialized in 304. It is next checked in 305 whether we have processed all streams. If not, we proceed with 306 to obtain some required information about the stream. In one exemplary implementation this information may include the elementary stream ID (which may have to be uniquely generated), the stream type (which the type of data format of the stream), and decoder specific information, if present. In 307 a unique OD ID is generated, that will be used both in the to be created OD stream and the SD stream. It essentially serves to connect each decoder to the appropriate SD scene element (node). Depending on the type of stream, the appropriate SD scene elements are created and added as a child of the root node in the Scene Replacement command that was created during initialization in 302. Similarly, in 309 the appropriate OD is created and added to the OD update message that was created during initialization in 302. The stream counter is incremented by one in 310, and control is directed back to block 305 to see if more streams need processing. If all streams have been dealt with, in 311 the Initial OD is created, which includes the Object Descriptors for the just created SD and OD streams. The three created MPEG-4 Systems components, SD stream, OD stream, and Initial OD are encoded in 312. Finally, in 313 the created MPEG-4 Systems components are passed to the MPEG-4 playback system, along with the multi-media presentation streams for which they were created. Note that even though the exemplary algorithm shown in FIG. 4 constructs the MPEG-4 Systems elements required for the start of a static scene, those skilled in the art will be able to use the same principles to construct more SD stream and OD stream messages that would be appropriate to update the scene description, such as for example adding an extra video stream if such a new video stream were to arrive at the Scene Description emulation block 203. Construction of the Scene Description (SD) stream components: a scene tree FIG. 5 shows an example of the construction of the SD scene, i.e. the tree composition, for the case when the multi-media presentation consists of a video and an audio elementary stream. Those skilled in the art can devise similar tree structures that accomplish the same. Also those skilled in the art can construct tree structures for different multi-media presentations, such as ones with just one audio elementary stream, presentations with still images, presentations with one or more video streams, or presentations with any combinations of different types of elementary streams.

In FIG. 5, the top or root node 401 contains two children, one for each object in the scene, namely for the video and audio elementary streams. In MPEG-4 Systems, the scene description of audio can be indicated by a combination of a Sound2D node 402 with an AudioSource node 403. The AudioSource node contains an identifier by means of an Object Descriptor ID, which determines which (audio) stream is to be connected to this node. The scene description of elementary stream is typically done with a Shape node 404. A Shape node typically has 2 children. One child determines the geometry, which in case of the exemplary scene structure is a Bitmap node 405. The appearance of the geometry is determined by an Appearance node 406 with in the case of elementary stream a MovieTexture node 407 as a child. Just as with the AudioSource node 403, the MovieTexture node 407 contains an identifier by means of an Object Descriptor ID that determines which (elementary stream) stream is to be connected to this node.

Generation of the SMIL Scene Description Component

Another exemplary embodiment of the present invention entails the generation of the SMIL scene description component. Those skilled in the art could use the exemplary implementation as explained above for MPEG-4 and apply this to the case of SMIL. For example, the detection of the presence of the SMIL scene description component can be done by determining if a SMIL document is present or not. In case absence is detected, appropriate SMIL document can then be artificially generated just as would be done for MPEG-4 where the MPEG-4 System components (IOD, OD stream, and Scene Description stream) were created. An example of such a SMIL document is given as follows:

```
<smil xmlns="http://www.w3.org/2000/SMIL20/CR/Language">
    <head>
        <layout>
            <root-layout width="352" height="288"/>
            <region id="region1" top="0" left="0"/>
        </layout>
    </head>
    <body >
        <par>
            <video region="region1" src="inputvideo"/>
            <audio src="inputaudio"/>
        </par>
    </body>
</smil>
```

Having thus described our invention what we claim as new, and desire to secure by Letters Patent is:

1. A method of permitting a scene description based player to play a set of elementary streams having no scene description, said method comprising:
    said player detecting if there is a scene description stream in a set of elementary streams, said scene description stream providing information on the position and interrelationship of audio visual objects in a scene; and
    if no scene description stream is detected, said player generating a scene description stream for displaying said set of elementary streams, wherein said scene description stream is used to permit said player to play said set of elementary streams.

2. A method as recited in claim 1, wherein, said set of multimedia streams comprises at least one of a single audio stream and a single visual stream, said generating a scene description stream comprises constructing an MPEG-4 scene replacement command with an MPEG-4 scene graph having nodes for rendering said audio and/or visual streams, generating an object descriptor stream by constructing MPEG-4 object descriptor update commands, and constructing an MPEG-4 initial object descriptor for describing said object descriptor stream and a scene description stream.

3. A method as recited in claim 2, wherein said plurality of commands comprises at least one of the following commands: a scene replacement command, a node insertion command, and a node deletion command.

4. A method as recited in claim 1, wherein said scene description stream is generated by an MPEG-4 scene description generator.

5. A method as recited in claim 1, wherein said scene description stream comprises a plurality of MPEG-4 scene description stream commands.

6. An apparatus for permitting a scene description based player to play a set of elementary streams having no scene description stream, said apparatus comprising:
    a scene description detector at said player for detecting in a received set of elementary streams whether there is a description stream providing information on the position and interrelationship of audio visual objects in a scene; and
    a scene description stream generator at said player for generating a scene description stream for displaying said set of elementary streams when no scene description stream is detected, wherein said scene description stream is used to permit said player to play said set of elementary streams.

7. A program storage device readable by a machine, tangibly embodying a program of instructions executable by the machine to perform method steps for permitting a scene description based player to play a set of elementary streams having no scene description stream, said method comprising:
    detecting at said player if there is an scene description stream in a set of received elementary streams, said scene description stream providing information on the position and interrelationship of audio visual objects in a scene; and
    if no scene description stream is detected, said player generating a scene description stream for displaying said set of elementary streams, wherein said scene description stream is used to permit said player to play said set of elementary streams.

8. A method of using an MPEG-4 player to playback a presentation that contains only audio visual streams, said method comprising the steps for said player of:
    constructing a scene graph with nodes for rendering visual and audio for a presentation with visual and audio;
    encoding said scene graph in a scene replacement command;
    constructing object descriptor update messages for said visual and audio;
    encoding said object descriptor update messages to generate an object descriptor stream;
    constructing an initial object descriptor which describes said object descriptor and scene description streams; and
    supplying said initial object descriptor, said object descriptor stream and said scene description stream to said MPEG-4 player to permit playback of said presentation.

9. A method of permitting a MPEG-4 systems based player to play a set of elementary streams having no MPEG-4 systems streams, said method comprising the steps for said player of:

detecting if there is an MPEG-4 system stream, said MPEG-4 system stream providing information on the position and interrelationship of audio visual objects in a scene; and if no MPEG-4 system stream is detected, generating an initial object descriptor, a scene description stream, and a object descriptor stream for displaying said set of elementary streams, wherein said initial object descriptor, said scene description stream, and said object descriptor stream are used to permit said player to play said set of elementary streams.

10. A method as recited in claim 9, wherein said MPEG-4 system stream is detected by checking for the presence of an initial object descriptor stream.

11. A method as recited in claim 9, wherein said MPEG-4 system stream is detected by checking for the presence of a scene description scene stream.

12. A method as recited in claim 9, wherein said MPEG-4 system stream is detected by checking for the presence of an object descriptor stream.

13. A method of permitting a Synchronized Multimedia Integration Language (SMIL) based player to play a set of elementary streams having no SMIL document, said method comprising:

said player detecting if there is an SMIL document, said SMIL document providing information on the position and interrelationship of audio visual objects in a scene; and if no SMIL document is detected, said player generating an SMIL document, where said SMIL document is used to permit said player to play said set of elementary streams.

14. An apparatus for permitting an SMIL based player to play a set of elementary streams having no SMIL document, said apparatus comprising:

an SMIL document detector at said player for detecting if there is an SMIL document, said SMIL document providing information on the position and interrelationship of audio visual objects in a scene; and an SMIL document generator at said player for generating an SMIL document if no SMIL document is detected, where said SMIL document is used to permit said player to play said set of elementary streams.

15. A program storage device readable by a machine, tangibly embodying a program of instructions executable by the machine to perform method steps for permitting a scene description based player to play a set of elementary streams having no scene description stream, said method comprising:

said player detecting if there is a Synchronized Multimedia Integration Language (SMIL) document, said SMIL document providing information on the position and interrelationship of audio visual objects in a scene; and if no SMIL document is detected, said player generating an SMIL document, where said SMIL document is used to permit said player to play said set of elementary streams.

\* \* \* \* \*